United States Patent

Neukam

[11] Patent Number: 5,609,236
[45] Date of Patent: Mar. 11, 1997

[54] ROLLER CONVEYING DEVICE

[75] Inventor: Helmut Neukam, Hausmannstätten, Austria

[73] Assignee: P.E.E.M. Förderanlagen Gesellschaft m.b.H., Graz, Austria

[21] Appl. No.: 604,862

[22] Filed: Feb. 22, 1996

[30] Foreign Application Priority Data

Mar. 21, 1995 [AT] Austria .......... 498/95

[51] Int. Cl.$^6$ .......... B65G 47/46
[52] U.S. Cl. .......... 198/370.1; 198/370.08
[58] Field of Search .......... 198/370.01, 370.08, 198/370.09, 370.1

[56] References Cited

U.S. PATENT DOCUMENTS

| | | | |
|---|---|---|---|
| 3,522,942 | 8/1970 | Hepp | 198/370.08 X |
| 3,680,692 | 8/1972 | Southworth | 198/370.1 X |
| 4,200,178 | 4/1980 | Gunti | 198/370.1 |
| 4,658,947 | 4/1987 | Welder | 198/370.01 X |
| 4,730,718 | 3/1988 | Fazio et al. | 198/370.1 |
| 4,798,275 | 1/1989 | Leemkuil et al. | 198/370.1 |
| 4,880,099 | 11/1989 | Leemkuil et al. | 198/370.1 |
| 4,926,999 | 5/1990 | Fauth, Sr. et al. | 198/370.1 X |
| 4,962,841 | 10/1990 | Kloosterhouse | 198/370.01 |
| 5,165,516 | 11/1992 | Reed et al. | 198/370.1 |

FOREIGN PATENT DOCUMENTS

| | | | |
|---|---|---|---|
| 2427810 | 12/1975 | Germany. | |
| 3125885 | 1/1983 | Germany. | |
| 3232764 | 6/1984 | Germany. | |
| 2256179 | 12/1992 | United Kingdom | 198/370.09 |

*Primary Examiner*—James R. Bidwell

[57] ABSTRACT

Device for laterally showing off transported goods transversally to the conveying direction of a roller conveyor having rollers supporting the goods. The rollers are pivotally arranged between two longitudinal spars and one of the rollers is connected to a drive unit. Transversal rollers, which can be driven by an elastic driving belt embracing a stationary drive unit, are provided between two adjacent rollers. The transversal rollers being supported in a vertically adjustable carrier, which allows the transversal rollers to be lifted beyond the supporting surface created by the rollers of the roller conveyor. In order to allow operation of such a device resulting in low wear and careful handling of the goods, it is provided that the carrier holds several pairs of transversal rollers and that each pair of adjacent transversal rollers is embraced by an endless discharge belt, the driving belt running over at least one transversal roller of each pair of transversal rollers.

1 Claim, 1 Drawing Sheet

5,609,236

ROLLER CONVEYING DEVICE

FIELD OF THE INVENTION

The invention relates to a device for laterally shoving off transported goods transversally to the conveying direction of a roller conveyor. The rollers of said roller conveyor serving as support for the goods to be transported and being pivotally arranged between two longitudinal spars. At least one of said rollers being connected to a drive unit. Transversal rollers, which can be driven by means of an elastic driving belt embracing a stationary drive unit, are provided between two adjacent rollers, said transversal rollers being supported in a vertically adjustable carrier, which allows the transversal rollers to be lifted above the supporting surface created by the rollers of the roller conveyor by means of a lifting appliance.

DESCRIPTION OF THE PRIOR ART with previously known roller conveyors of this kind, the lateral shoving off of the transported goods in most cases ensues through tongues standing perpendicularly to the plane defined by the rollers and being pivotable into the conveying path, with which tongues the single pieces may be deflected and shoved off laterally. Thereby, however, accordingly large intermittent spaces between the single pieces are required for the tongues to be safely pivoted into and out of the conveying path before the next piece, which is not to be deflected, reaches the area of the tongue.

This, however, causes an according decrease in the transport capacity of the roller conveyor.

From the U.S. Pat. No. 4,962,841 A, a device of the kind mentioned above has been known, in which the transversal rollers comprise a groove running around their circumference serving to hold the driving belt, this driving belt, which has a substantially circular cross-section and projects beyond the surfaces of the transverse rollers, at the same time serving as a conveyor belt for the goods to be shoved off. Thereby, however, the disadvantage arises of very high local strain imposed on the driving belts through the goods to be shoved off, resulting in very strong wear on the belts.

Furthermore, a device for shoving off transported goods perpendicular to the conveying direction of a roller conveyor has been known from the DE 32 32 764 A, in which device transversal rollers are connected to belt pulleys of a smaller diameter and driving belts run on these pulleys. Thereby two groups of transversal rollers are provided which comprise more than two transversal rollers respectively, whose pulleys are embraced by one common driving belt. The adjacent rollers of the two groups are connected through further belt pulleys which are embraced by another driving belt which runs over a driven pulley.

With this solution, the disadvantage occurs of high surface pressure on the bottoms of the goods to be shoved off resulting from the relatively small diameter and width of the transverse rollers and possibly leading to damage in the bottom area particularly of heavy goods.

SUMMARY OF THE INVENTION

It is the object of the present invention to avoid these disadvantages and to propose a device of the kind mentioned above which allows operation resulting in low wear and avoiding damage.

According to the invention, these goals are reached with a device of the kind mentioned above through the following measures: several pairs of transversal rollers are pivotally attached to the supporting carrier, each pair of transversal rollers arranged side-by-side being embraced by an endless discharge belt and the driving belt running over at least one roller of each pair of transversal rollers.

Through the proposed measures, the advantage arises that flat belts of relatively broad dimension may be used, resulting in very careful treatment of the goods to be shoved out. Generally, relatively short belt lengths arise and result in suspension of the goods at relatively short distances. A further result is that the driving belt only has to be tensioned sufficiently to allow transmission of power at the times when the transversal rollers are in their operating position, i.e. when they are elevated above the plane defined by the conveying rollers. This results in low wear on the driving belt.

DETAILED DESCRIPTION OF THE INVENTION

The invention will now be explained in detail according to the drawing, in which.

Figure 1:
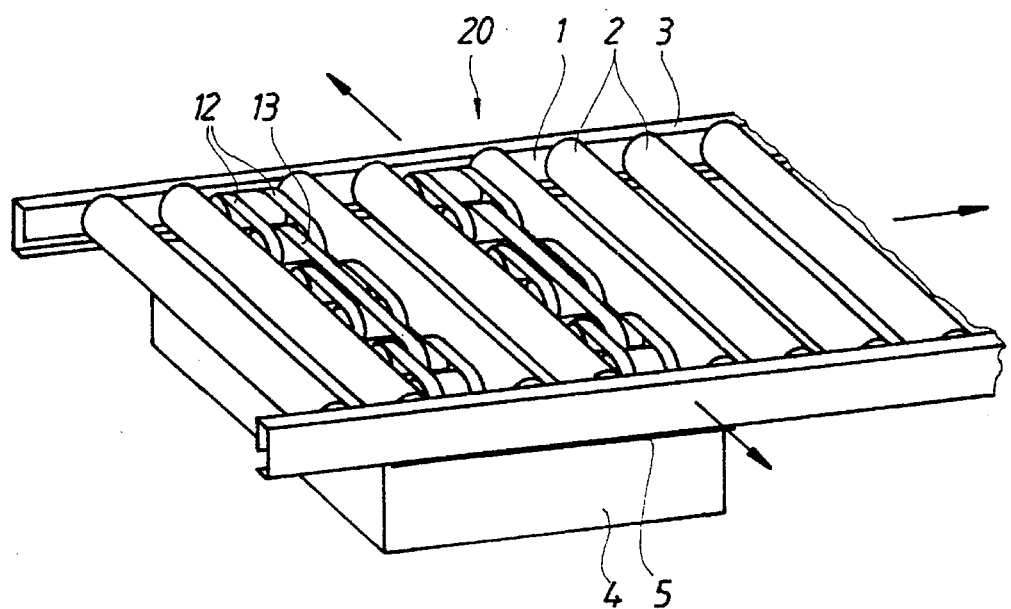
FIG. 1 shows part of a roller conveyor with a device according to the invention in axonometric view.

A roller conveyor 20 typically comprises two longitudinal spars 1, in which rotatory rollers 2 are supported, the highest surface lines of the rollers 2 proceeding beyond the upper sides 3 of the longitudinal spars 1.

Attached to the lower side of the longitudinal spars 1 is a casing 4. The lateral surfaces of the casing 4 are angled outwardly on their upper rims proceeding in the direction of the longitudinal spars, the angled parts forming flange surfaces which are penetrated by screws (not shown in the drawing for reasons of clearness) mounted on the longitudinal spars 1.

Figure 2:
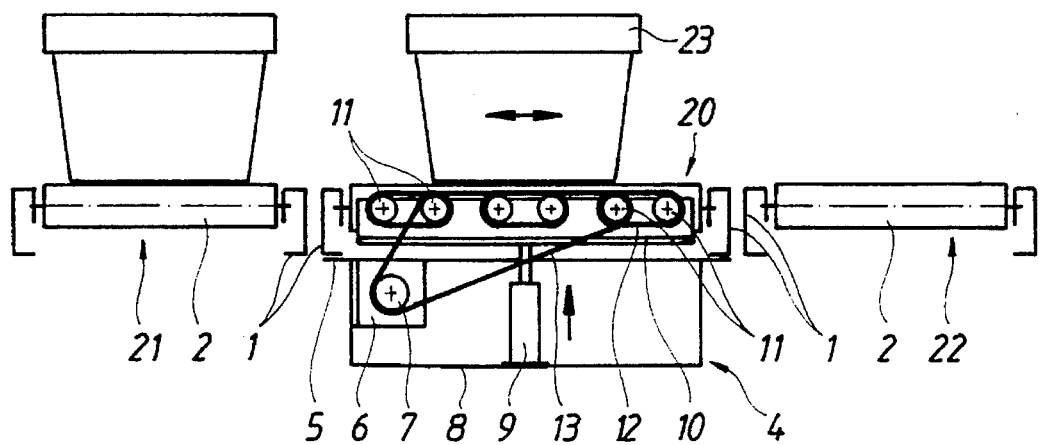
FIG. 2 is a sectional drawing of a distribution installation with roller conveyors and a device according to FIG. 1.

As can be seen particularly in FIG. 2, a driving motor 6 provided with a driving pulley 7 is arranged permanently in the casing 4.

Furthermore, a lifting appliance 9, comprising a cylinder-piston unit, which holds a vertically adjustable carrier 10, is supported at the bottom 8 of the casing 4.

In this carrier 10, which proceeds parallel to the rollers 2 of the roller conveyor 20, three pairs of transversal rollers 11 are pivotally arranged in the described embodiment of the invention. Each pair of transversal rollers 11 is embraced by a pair of discharge belts 12 which are arranged close to the front sides and ends respectively of the transversal rollers 11.

The transversal rollers 11 are driven by an elastic belt 13 running over the driving pulley 7 of the motor 6, over the central pair of transversal rollers 11, and over the respective transversal rollers 11 of the outer pairs of transversal rollers 11 lying closer to the longitudinal center line of the roller conveyor 20.

In order to shove out a piece 23 arriving on the roller conveyor 20 in a stream of goods separated by small distances, the lifting appliance 9 is activated as soon as the piece 23 reaches the area of the device according the invention. The carrier 10 is lifted so that the uppermost surface lines of the discharge belts 12 proceed above the uppermost surface lines of the rollers 2. At the same time, the driving motor 6, whose sense of rotation is reversable, is activated and drives the discharge belts 12 in the desired direction by means of the elastic belt 13. Thereby, the piece 23 now lying on the discharge belts 12 is conveyed off the roller conveyor 20 at a right angle to the conveying direction and, as an example, may be delivered to a roller conveyor 21 or 22 proceeding next to the roller conveyor 20 and further transported there, or as another example, may be delivered to a slide leading it to an according collecting point.

I claim:

1. Device which is part of a roller conveyor, said device serving to laterally shove off transported goods transversally to a conveying direction, said roller conveyor being provided with a multitude of pivoted rollers arranged between two parallel-running longitudinal spars, the surfaces of said rollers serving as a supporting surface for the goods to be transported, and at least one of said rollers being connected to a drive unit, transversal rollers being arranged at least between two adjacent rollers of the roller conveyor, which transversal rollers can be driven by means of an elastic driving belt embracing a stationary drive unit, the axes of said transversal rollers standing at a right angle to the axes of the rollers of the roller conveyor and being held in a carrier which may be lifted and lowered by means of a lifting appliance acting upon the carrier, the supporting surface created by the transversal rollers thereby being allowed to be lifted above the supporting surface for the goods which is created by the rollers of the roller conveyor, characterized in that several pairs of transversal rollers are pivotally arranged in the carrier, each pair of adjacent transversal rollers being embraced by an endless discharge belt and the driving belt running over at least one transversal roller of each pair of transversal rollers.

* * * * *